(12) United States Patent
Song

(10) Patent No.: US 7,042,932 B1
(45) Date of Patent: May 9, 2006

(54) SYNCHRONIZATION DETECTION ARCHITECTURE FOR SERIAL DATA COMMUNICATION

(75) Inventor: Hongjiang Song, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/473,740

(22) Filed: Dec. 28, 1999

(51) Int. Cl.
*H04B 17/02* (2006.01)
*H04L 7/00* (2006.01)
*H04L 25/00* (2006.01)

(52) U.S. Cl. .................... 375/211; 375/368; 375/372

(58) Field of Classification Search .......... 375/211, 375/214, 354, 257, 357, 225, 362–372; 341/61; 369/47.28, 47.29, 47.3; 370/232, 233, 234
See application file for complete search history.

(56) References Cited

U.S. PATENT DOCUMENTS

| | | | | |
|---|---|---|---|---|
| 5,063,575 A | * | 11/1991 | Annamalai | 375/357 |
| 5,068,880 A | * | 11/1991 | Kline et al. | 375/368 |
| 5,357,542 A | * | 10/1994 | Suzuki | 370/315 |
| 5,493,589 A | * | 2/1996 | Ibenthal | 375/372 |
| 5,497,187 A | * | 3/1996 | Banker et al. | 348/478 |
| 5,671,249 A | * | 9/1997 | Andersson et al. | 340/825.2 |
| 5,790,610 A | * | 8/1998 | Julyan | 370/340 |
| 5,956,377 A | * | 9/1999 | Lang | 375/372 |

\* cited by examiner

*Primary Examiner*—Don N. Vo
(74) *Attorney, Agent, or Firm*—Trop, Pruner & Hu, P.C.

(57) ABSTRACT

A method includes receiving an indication of incoming data from a first serial bus and buffering the bits to accommodate a difference between a first rate of the incoming data and a second rate of outgoing data. During the buffering, the method includes detecting if at least some of the bits indicate a synchronization field.

8 Claims, 3 Drawing Sheets

SYNCHRONIZATION DETECTION ARCHITECTURE FOR SERIAL DATA COMMUNICATION

BACKGROUND

The invention generally relates to a synchronization detection architecture for serial data communication.

A repeater may be used to relay data between two serial buses. In this manner, a repeater 5 (see FIG. 1) may receive signals (from a serial bus 10) that indicate data and generate signals on another serial bus 20 to relay the data between the buses 10 and 20. In the course of its operation, the repeater 5 sorts out valid data from noise to ensure the integrity of the communications between the two serial buses 10 and 20.

More particularly, the repeater 5 may include a receiver 12 to receive data from the serial bus 10 and a transmitter 14 to communicate data to the serial bus 20. In this manner, the receiver 12 may include a data recovery circuit (DRC) 16 to recover data from the signals that are received from the serial bus 10. Besides recovering data from the serial bus 10, the data recovery circuit 16 typically queues, or buffers, the received data to accommodate the difference between the rate at which the data is received from the serial bus 10 and the rate at which the transmitter 14 communicates data to the serial bus 20.

The data typically is communicated over the serial bus 10, 20 in data packets, or frames. The beginning of a particular frame is marked by a predetermined bit pattern called a start, or synchronization, field, and the repeater 5 may monitor the incoming data to detect the synchronization field to identify a valid frame. In this manner, the repeater 5 does not enable the transmitter 14 to communicate a frame to the serial bus 20 until the repeater 5 has detected the synchronization field that is associated with that frame.

To detect the synchronization field, the receiver 12 may include a synchronization detection circuit 18 that receives recovered bits from the data recovery circuit 16. In this manner, the synchronization detection circuit 18 monitors the recovered bits (from the data recovery circuit 16) to detect the synchronization field, and once detected, the synchronization circuit 18 enables (via a signal line 24) the transmitter 14 to communicate the associated frame to the serial bus 20. This frame includes the recovered bits of data that form the synchronization field and the proceeding recovered bits of data that form the remainder of the frame. Therefore, all bits of data that are recovered by the data recovery circuit 16 typically passes through the synchronization circuit 18 and then through the transmitter 14 before being communicated to the serial bus 20.

Unfortunately, because all data passes through the synchronization circuit 18, a significant delay may be introduced by the synchronization detection circuit 18, and this delay is in addition to any delay that is introduced by the data recovery circuit 16. For a chain of the repeaters 5, the delays that are introduced by each repeater 5 accumulate and may have a significant impact to the overall system performance. Furthermore, bits may be lost during the repeating process, and as a result, a new synchronization field may have to be regenerated for the retransmission of some frames.

Thus, there is a continuing need for an arrangement that addresses one or more of the problems that are stated above.

SUMMARY

In an embodiment of the invention, a method includes receiving an indication of incoming data from a first serial bus and buffering the bits to accommodate a difference between a first rate of the incoming data and a second rate of outgoing data. During the buffering, the method includes detecting if at least some of the bits indicate a synchronization field.

Advantages and other features of the invention will become apparent from the following drawing, from the description and claims.

DETAILED DESCRIPTION

Figure 1:
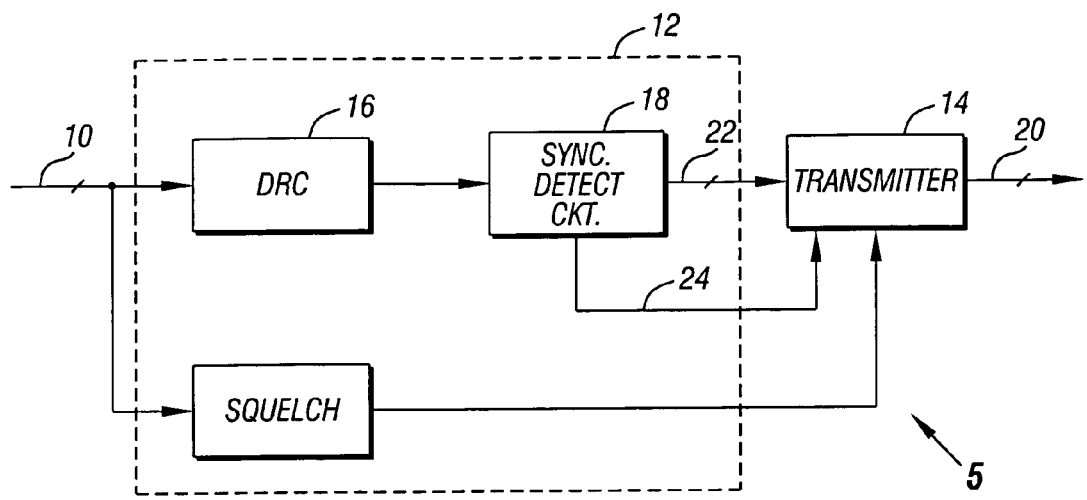
FIG. 1 is a schematic diagram of a repeater of the prior art.
Figure 2:
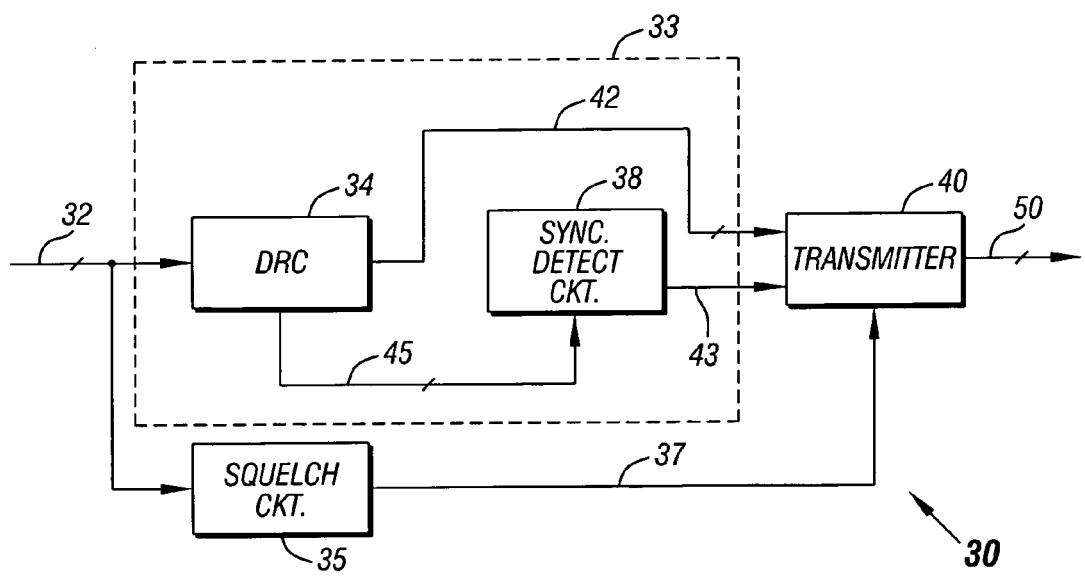
FIG. 2 is a schematic diagram of a repeater according to an embodiment of the invention.

Referring to FIG. 2, an embodiment 30 of a serial bus repeater in accordance with the invention includes a serial bus receiver 33 and a serial bus transmitter 40. The receiver 33 is coupled to a serial bus 32 and may receive, for example, one or more signals that indicate bits of data, and when enabled (as described below), the transmitter 40 generates one or more signals on a serial bus 50 to relay this data.

Serial buses typically are subject to noise and thus, the serial bus communications may be effected by a noisy environment. To minimizing the effects of noise, the repeater 28 includes at least two features to ensure reliable data communication. In particular, the repeater 28 includes a synchronization detection circuit 38 to detect a synchronization field, a bit field used to indicate the beginning of a frame of data, and a squelch circuit 35 to determine whether voltages on the serial bus 32 are indicative of noise or indicate logical levels of data bits. If valid data is being received (as indicated by the squelch circuit 35) and the synchronization detection circuit 38 detects a synchronization field, then the transmitter 40 is enabled to communicate the associated frame of data, a frame that includes the bits of the detected synchronization field and the bits that follow the synchronization field and form the remainder of the frame.

In a conventional repeater, bits of data that indicate a synchronization field pass through a data recovery circuit and then pass through a synchronization detection circuit, an arrangement that may introduce a significant latency. Unlike the conventional repeater, to detect the synchronization field, the synchronization detection circuit 38 monitors incoming data while the data is propagating through a data recovery circuit 34 (of the repeater 30) thereby reducing the overall latency that may otherwise be introduced by the receiver 30. Thus, due to this arrangement, the overall latency that is introduced by the repeater 30 is the greater of the delay that is introduced by the data recovery circuit 34 or the delay that is introduced by the synchronization detection circuit 38.

In this course of its operation, the data recovery circuit 34 receives one or more signals from the serial bus 32 and converts these signals into indications of bits of data. The data recovery circuit 34 may queue, or buffer, this incoming data for purposes of accommodating different data rates between the incoming data and the outgoing data that is communicated over the serial bus 50. In this manner, if the incoming data is being received at a rate that is higher than the rate at which the transmitter 40 is communicating outgoing data to the serial bus 50, then the data recovery circuit 34 buffers the incoming bits to compensate for the different rates. In some embodiments, while the data recovery circuit 34 is buffering the incoming data, the synchronization detection circuit 38 monitors the buffered data to detect a bit pattern that indicates the synchronization field.

When the synchronization detection circuit 38 detects the synchronization field, the circuit 38 enables the transmitter 40 to communicate the frame that is associated with the synchronization field over the serial bus 50. In this manner, in some embodiments, after the transmitter 40 communicates a particular frame over the serial bus 50, the transmitter 40 is not again enabled to transmit again until both the synchronization detection circuit 38 indicates the detection of another synchronization field and the squelch circuit 35 indicates that valid logical levels are present on the serial bus 32. When these two conditions occur, the transmitter 40 is enabled to communicate the frame that is associated with the detected synchronization field to the serial bus 50.

In some embodiments, once enabled to transmit, the transmitter 40 receives the bits of the synchronization field (from the data recovery circuit 34) before the other bits of the frame. Thus, the transmitter 40 does not regenerate the synchronization field, but instead, the transmitter 40 relays the buffered synchronization field to the serial bus 50. The transmitter 40 then receives the remaining bits of the frame and communicates these bits to the serial bus 50.

Figure 3:
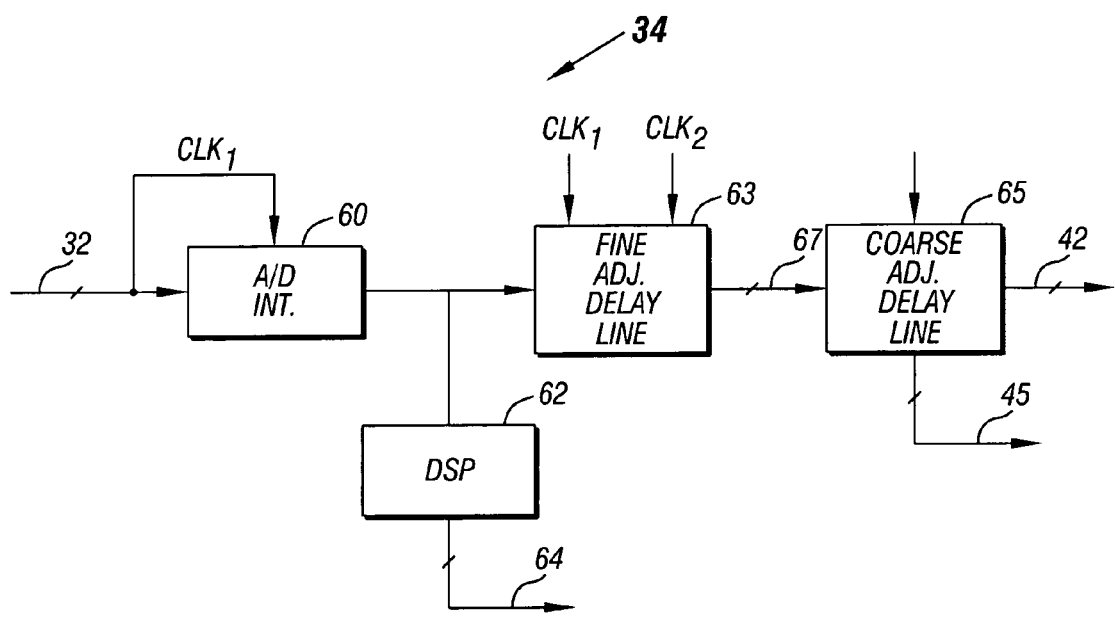
FIG. 3 is a schematic diagram of a data recovery circuit of the repeater of FIG. 2 according to an embodiment of the invention.

Referring to FIG. 3, in some embodiments, the data recovery circuit 34 may include an analog-to-digital (A/D) interface 60 that receives a clock signal (called $CLK_1$) from a clock line of the serial bus 32 and other signals from data lines of the serial bus 32. In this manner, on each cycle of the $CLK_1$ signal, the A/D interface 60 samples and converts two analog data signals from the serial bus 32 into two bits that are received by a fine adjustment delay line 63. The delay line 63 delays the bits to adjust the phase between the $CLK_1$ clock signal of the serial bus 32 and the $CLK_2$ clock signal of the serial bus 50. The phase adjusted bits subsequently pass into a coarse adjustment delay line 65, a delay line that delays the bits by a multiple number of $CLK_2$ cycles to accommodate an overall difference in the data rates between the incoming and outgoing data serial buses 32 and 50. In this manner, the coarse adjustment delay line 65 queues, or buffers, the incoming bits to approximately match the rate at which the data is available for transmission to the rate at which the transmitter 40 is communicating the data to the serial bus 50. In some embodiments, a digital signal processing (DSP) engine 62 (of the data recovery circuit 34) adjusts (via control lines 64) the delays that are introduced by the fine adjustment delay line 63 and the coarse adjustment delay line 65.

Figure 4:
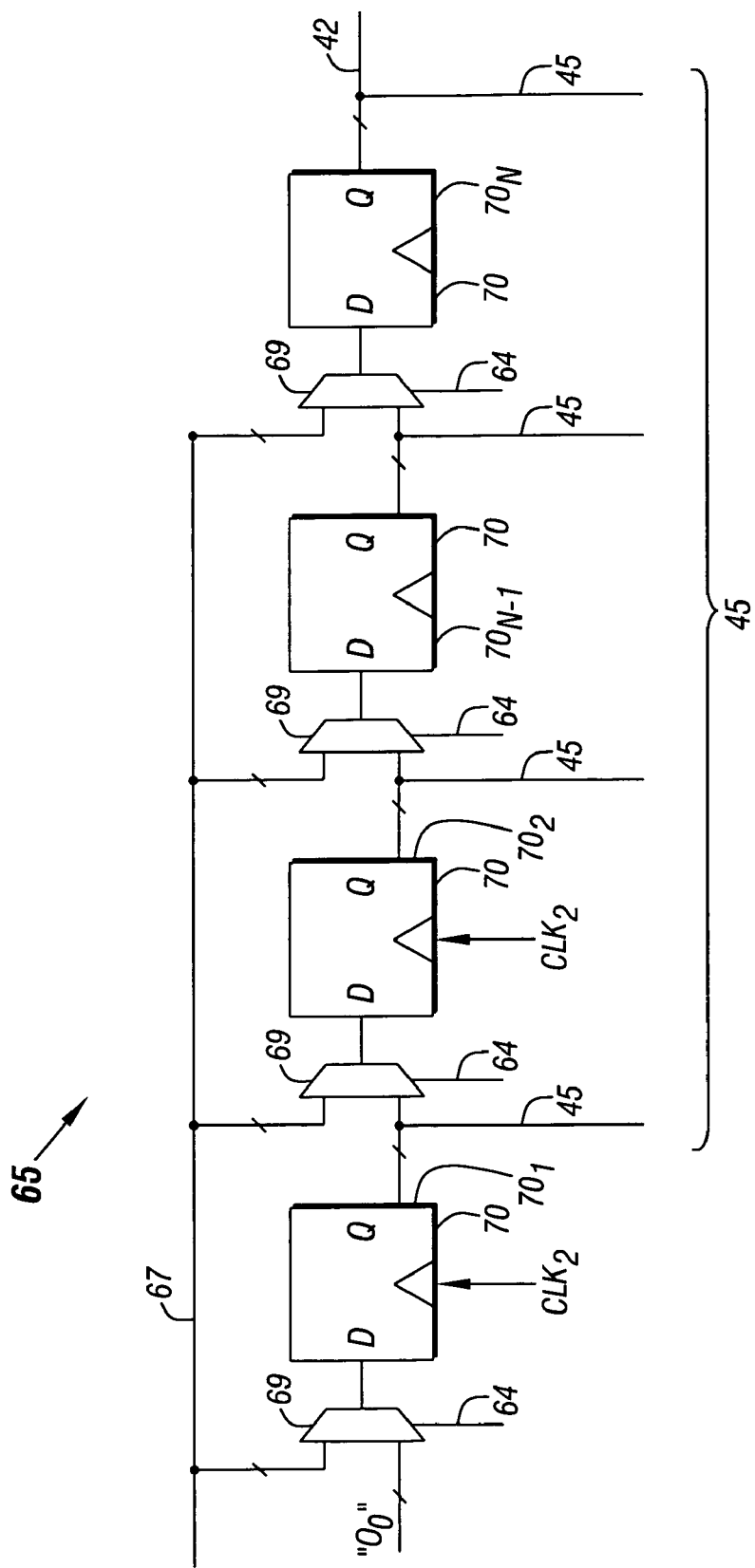
FIG. 4 is a schematic diagram of a coarse adjustment delay line of the data recovery circuit of FIG. 3 according to an embodiment of the invention.

Referring also to FIG. 4, in some embodiments, the coarse adjustment delay line 65 includes registers 70 (registers $70_1$, $70_2$, ... $70_{N-1}$ and $70_N$, as examples), each of which may be used to introduce a delay of one $CLK_2$ clock cycle. As an example, each register 70 may be a D-type flip-flop. In some embodiments, the registers 70 are serially coupled together to form a first-in-first-out (FIFO) that has a fixed output pointer and an adjustable input pointer to allow adjust of the coarse delay. More particularly, in some embodiments, the registers 70 are serially coupled together in the following order: register $70_1$ to $70_2$ ... to $70_{N-1}$ to $70_N$, with the output terminals 45 of the register $70_N$ forming output terminals 42 of the coarse delay line 34. The input terminals of each register 70 are coupled to the output terminals of an associated multiplexer 69. In this manner, one set of input terminals of each multiplexer 69 is coupled to input lines 67 of the delay line 65, and another set of input terminals of each multiplexer 69 (the multiplexer 69 that is associated with the register 70, being the exception) is coupled to the output terminals 45 of the preceding register 70. The select terminals of the multiplexers 69 are coupled to the control lines 64. Due to this arrangement, the DSP engine 62 may use the control lines 64 to select which register 70 receives the input signals from the lines 67 and thus, control the input pointer in this manner.

The DSP engine 62 adjusts the coarse delay by moving the input pointer of the FIFO. For example, the DSP engine 62 may adjust the input pointer to store the data from the fine adjustment delay line 63 in the registers $70_{N-1}$ and thus, introduce a two clock (the $CLK_2$ clock) delay in the propagation of the incoming data through the coarse delay line 65. As another example, the DSP engine 62 may move the input pointer to provide the data from the fine adjustment delay line 63 to the first register 70, of the FIFO to introduce the maximum delay to the data.

The synchronization detection circuit 38 is coupled to a contiguous block of the registers 70 to detect the synchronization field. For example, the synchronization detection circuit 38 may be coupled to output terminals 45 of a contiguous group of registers 70 that includes the last register $70_N$. As an example, the synchronization detection circuit 38 may include a digital comparator that compares the signals that are provided by the terminals 71 of a selected group of the registers 70 with a predetermined bit pattern. Based on the result of the comparison, the comparator either asserts (drives high, for example) or deasserts (drives low, for example) the line 24 for purposes of selectively enabling or disabling the transmitter 40.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

The invention claimed is:

1. A method comprising:
   receiving an indication of bits of incoming data from a first serial bus;
   buffering the bits to accommodate a difference between a first rate of the incoming data and a second rate of outgoing data;
   during the buffering, detecting whether at least some of the bits indicate a synchronization field;
   detecting valid logic levels on the first serial bus; and
   selectively enabling a transmitter to communicate the incoming data to a second serial bus based on the detection of whether at least some of the bits indicate the synchronization field and the detection of valid logic levels on the first serial bus.

2. The method of claim 1, further comprising:
   buffering the synchronization field; and
   communicating the buffered synchronization field to the second serial bus.

3. The method of claim 1, wherein the buffering comprises:
   passing the bits through a delay line.

4. The method of claim 1, wherein the detecting comprises:

comparing at least some of the bits to an indication of a predetermined bit pattern.

5. A system comprising:

a first serial bus;

a second serial bus; and a repeater coupled to the first and second serial busses to receive an indication of bits of incoming data from the first serial bus, concurrently buffer the bits to accommodate a difference between a first rate of the incoming data and a second rate of outgoing data and, detect whether at least some of the bits indicate a synchronization field, detect valid logic levels on the first serial bus, and selectively enable transmission to the second serial bus based on the detection of the synchronization field and the detection of valid logic levels on the first serial bus.

6. The system of claim 5, wherein the repeater comprises:

a receiver to receive an indication of bits of the incoming data from the first serial bus; and a transmitter to communicate the bits to a second serial bus to form the outgoing data.

7. The system of claim 6, further comprising:

a synchronization circuit to detect the synchronization field and selectively enable the transmitter in response to the detection.

8. The synchronization circuit of claim 5, wherein the synchronization detection circuit comprises:

a comparator to compare at least some of the bits to an indication of a predetermined bit pattern to perform the detection.

* * * * *